No. 826,849. PATENTED JULY 24, 1906.
W. HARTMANN.
VALVE GEAR.
APPLICATION FILED SEPT. 21, 1905.
3 SHEETS—SHEET 1.
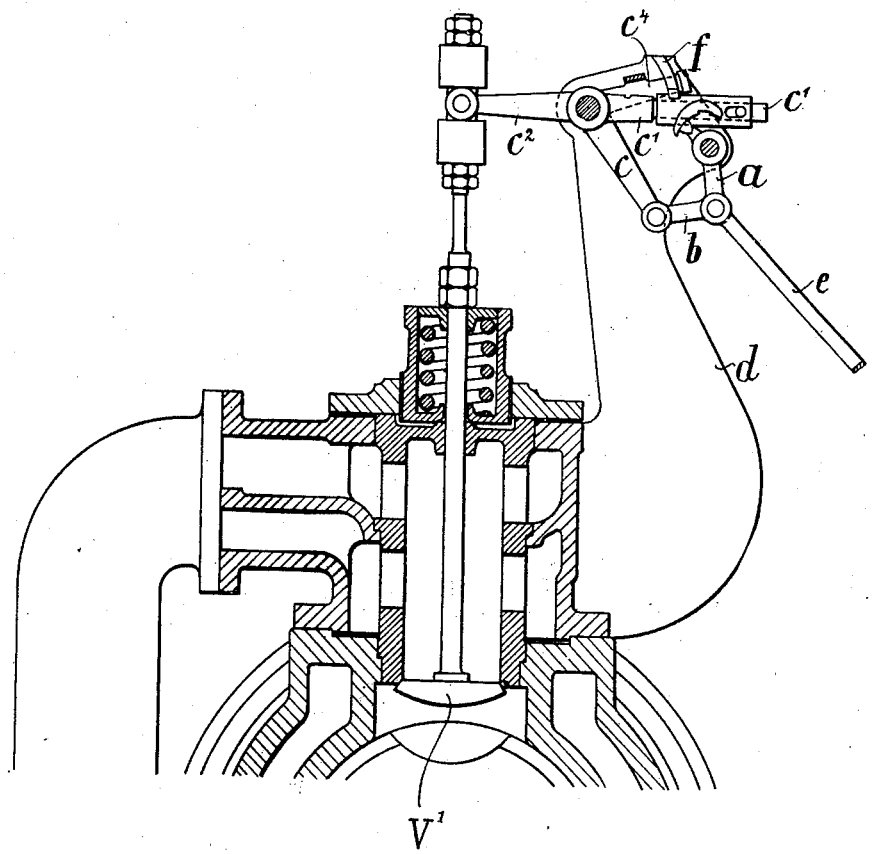

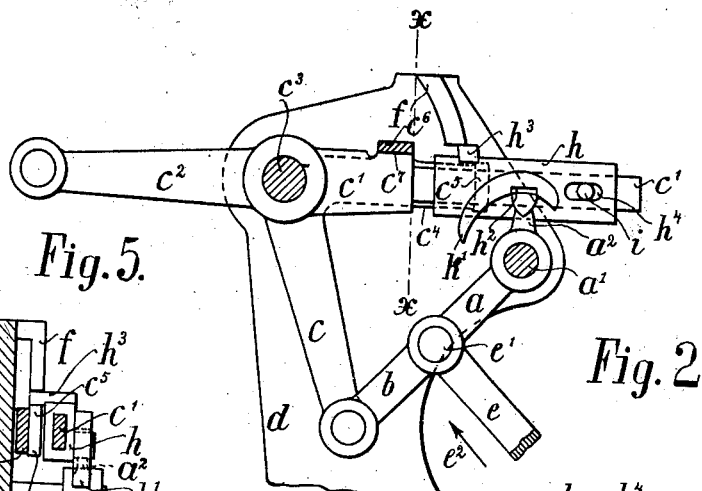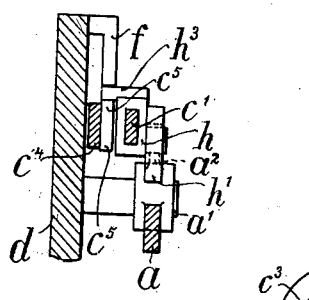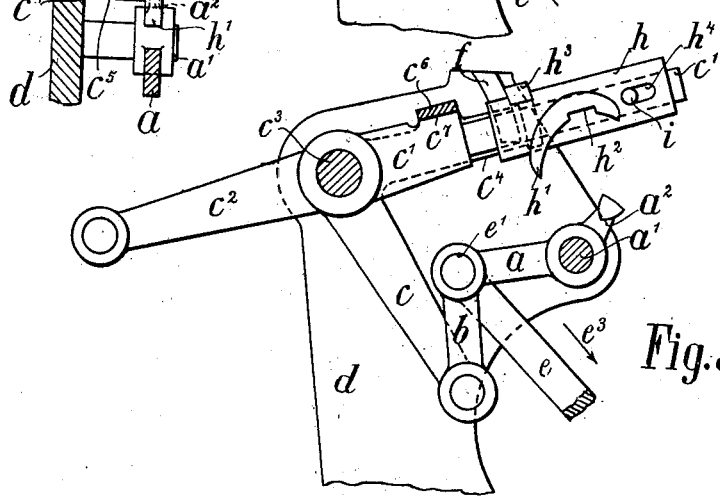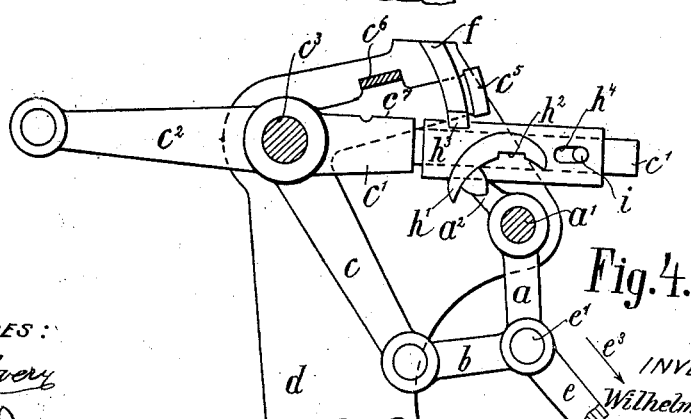

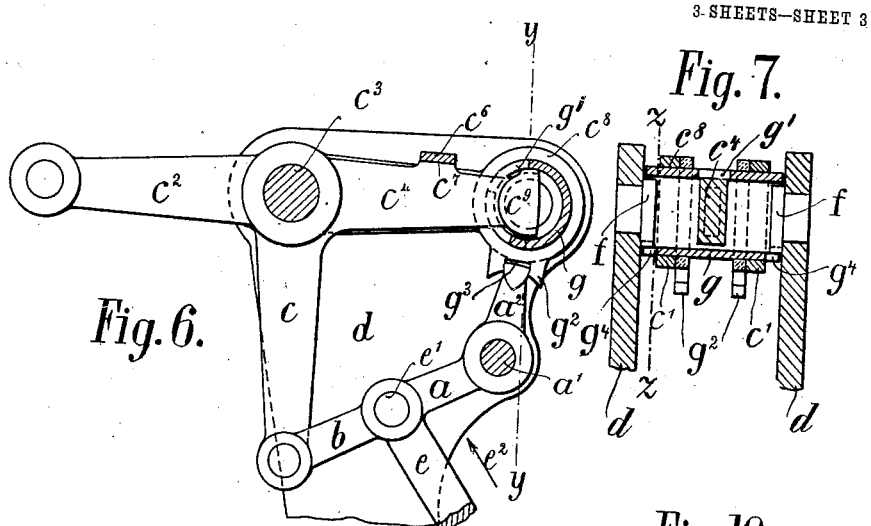
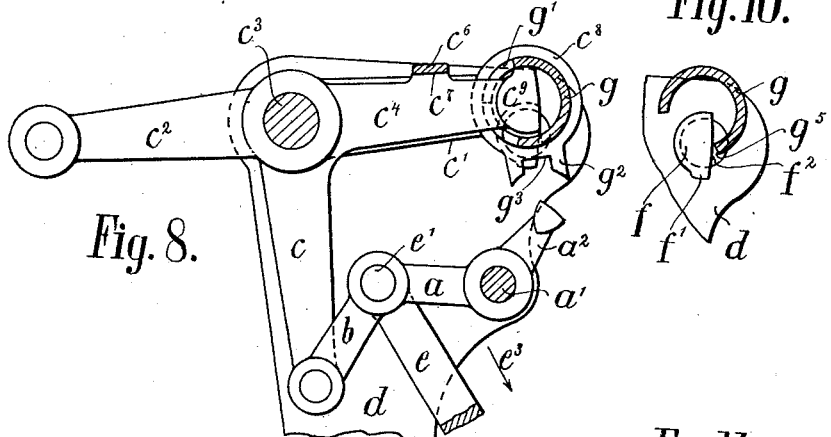
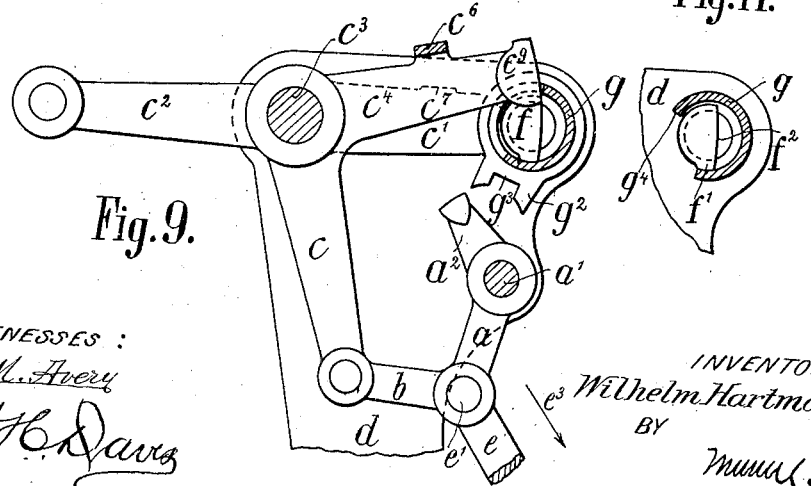

UNITED STATES PATENT OFFICE.

WILHELM HARTMANN, OF BERLIN, GERMANY.

VALVE-GEAR.

No. 826,849.   Specification of Letters Patent.   Patented July 24, 1906.

Application filed September 21, 1905. Serial No. 279,425.

*To all whom it may concern:*

Be it known that I, WILHELM HARTMANN, a subject of the King of Prussia, German Emperor, and a resident of 64 Augsburgerstrasse, Berlin, Germany, have invented a new and Improved Valve-Gear, of which the following is a full, clear, and exact description.

The invention relates to valve-gears for use on steam-engines, gas-engines, and other motors.

In my application, Serial No. 210,826, filed June 2, 1904, I described a valve-gear which is positive in its action, requiring comparatively little working power, and arranged to prevent undue influence on the governor by back strains.

The present invention enables me to dispense with the rocking arm actuating the valve-lever by using a detent mechanism which alternately connects the valve-lever with the driving mechanism and locks the valve-lever during the period in which the valve is closed.

Figure 1 is a cross-section of the upper part of a gas-engine with the valve and a view of its actuating device. Figs. 2 to 4 are similar views showing only the actuating parts in different positions. Fig. 5 is a cross-section substantially on line $x\,x$, Fig. 2. Fig. 6 is a side view of a modification of this actuating device; and Fig. 7, a cross-section substantially on line $y\,y$, Fig. 6. Figs. 8 and 9 are similar views of the same device, showing the parts in different positions. Figs. 10 and 11 are cross-sections substantially on line $z\,z$, Fig. 7, showing different positions of the parts.

The valve V', Fig. 1, is engaged by the arm $c^2$ of a two-armed lever having its shaft $c^3$ journaled in a suitable bracket $d$, attached to the frame of the engine. The other arm $c'$ of the said two-armed lever is provided with a slide $h$, having an escapement-piece $h'$ with notch $h^2$ and a projection $h^3$. A pin $i$ of the arm $c'$, passing through the slot $h^4$ of the slide $h$, limits the motion of the slide. A lever $a$, having its shaft $a'$ likewise journaled on the bracket $d$, is provided with an arm $a^2$, adapted to engage with its free end the notch $h^2$ of the escapement-piece $h'$. The lever $a$ is by a pivot connected at $e'$ with a link $e$, receiving a to-and-fro motion by an eccentric or crank mechanism, (not shown in the drawings,) the link $e$ being also connected at $e'$ with a link $b$ by a pivot connected with the free end of the arm $c$ of a bell-crank lever mounted to swing loosely on the shaft $c^3$ as a fulcrum. The other arm $c^4$ of this bell-crank lever is provided with two projections $c^5$ and $c^6$, adapted to engage, respectively, with the projection $h^3$ of the slide $h$ and the upper surface $c^7$ of arm $c'$. $f$ is a fixed projection secured to the bracket $d$ and adapted to be engaged by the projection $h^3$ of the slide $h$.

When the several parts are in the position illustrated in Fig. 2 and the link $e$ is caused to move in the direction of the arrow $e^2$, a swinging motion is imparted to the lever $a$, causing a shifting motion of the slide $h$ to the right by means of the arm $a^2$ engaging the notch $h^2$ of the escapement-piece $h'$, so that the projection $h^3$ is brought out of engagement with the fixed projection $f$ and engages the projection $c^5$ of arm $c^4$ of the bell-crank lever $c\,c^4$. A swinging motion is then imparted to this bell-crank lever by the link $e$, which causes the arm $c'$, by means of the projection $h^3$ engaging the projection $c^5$, to move into the position shown in Fig. 3, in which the valve is opened. During this movement the slide $h$ is prevented from moving to the left by the fixed projection $f$ being in contact with the projection $h^3$ of the slide $h$.

When the link $e$ is caused to move in the inverse direction—that is, as indicated by the arrow $e^3$, Fig. 3—then the bell-crank lever $c\,c^4$, by means of the projection $c^6$ of arm $c^4$ engaging the upper surface $c^7$ of arm $c'$, imparts a return swinging motion to the two-armed valve-lever $c'\,c^2$, so that the valve V' is moved back to its seat. On this return movement of the link $e$ in the direction of the arrow $e^3$, Fig. 3, the arm $a^2$ of the lever $a$ will come again into engagement with the notch $h^2$ of the escapement-piece $h'$, Fig. 2, and cause the shifting motion of the slide $h$ to the left, moving the projection $h^3$ out of engagement with the projection $c^5$ of arm $c^4$ and the same projection $h^3$ into engagement with the fixed projection $f$. On the further return movement of the link $e$ in the direction of arrow $e^3$, causing again a swinging movement of the bell-crank lever $c\,c^4$, Figs. 1 and 4, the two-armed lever $c'\,c^2$ is locked to the bracket $d$ by means of the projection $h^3$ being in engagement with the fixed projection $f$, and the bell-crank lever $c\,c^4$ will swing freely without the valve-lever, as clearly illustrated in Figs. 1 and 4.

From the foregoing it will be seen that the continuous forward and return motion of the link $e$, as described, causes an intermittent swinging motion of the two-armed lever $c'$ $c^2$, so that the valve $V'$ is opened and closed and held closed the desired length of time. It is further understood that the opening of the valve $V'$ is caused by coupling the bell-crank lever $c$ $c^4$ with the two-armed valve-lever by means of the slide $h$, which in another position locks the two-armed lever, while the bell-crank lever is unlocked from the two-armed valve-lever, and thus released. The slide $h$ acts thus as a locking or detent member, which in one position couples two levers together and in the other position locks the valve-lever, while the driving-lever is free or released. This detent member may adapt various forms, as shown, for instance, in Figs. 6 to 11, in which the detent member is a hollow cylinder provided with several openings. In this form of the valve-gear two parallel arms $c'$ are connected to the shaft $c^3$ of the two-armed valve-lever, and the arm $c^4$ of the bell-crank lever $c$ $c^4$ lies between these two arms $c'$. The detent member is mounted in bearings $c^8$, provided at the free ends of the two parallel arms $c'$ and consists of a hollow cylinder $g$, having a middle opening $g'$, in which may enter the free end of the arm $c^4$ of the bell-crank lever $c$ $c^4$, Figs. 6 and 7. The hollow cylinder $g$ is provided with two lugs $g^2$, having notches $g^3$, adapted to be engaged by the arm $a^2$ of lever $a$. The two ends of the hollow cylinder $g$ are open and provided with notches $g^4$. (Clearly shown in Fig. 11.) The free end of the arm $c'$ is provided with projections $c^9$ of peculiar form, (clearly shown in Fig. 6,) capable of entering into the hollow cylinder $g$.

$f$ represents projections secured to the brackets $d$ and having lugs $f'$ and curved surfaces $f^2$, as shown in Fig. 10, capable of engaging with the hollow cylinder $g$.

The operation of this gear is substantially the same as that shown in Figs. 2 to 5. When the several parts are in the position illustrated in Fig. 6 and the link $e$ is moved in the direction of the arrow $e^2$, the arm $a^2$ engages the notches $g^3$ of the lugs $g^2$, thus causing the hollow cylinder $g$ to be turned to the left, whereby the projections $c^9$ of the arm $c^4$ are engaged by the hollow cylinder $g$ and cause the arms $c'$ of the valve-lever $c'$ $c^2$ to swing with the bell-crank lever $c$ $c^4$ and open the valve, as described, before and as shown in Fig. 8. In this position the ends of the hollow cylinder $g$ are released from the fixed projections $f$, as shown in Fig. 10, the parts $g^5$ of the notches $g^4$ sliding over the curved surfaces $f^2$ of the projections $f$ and preventing the cylinder $g$ from being turned. When the link is caused to move in the inverse direction, as indicated by arrow $e^3$, Fig. 8, then the bell-crank lever $c$ $c^4$ by means of the projection $c^6$ of arm $c^4$ engaging the upper surface $c^7$ of arms $c'$ imparts a return swinging motion to the two-armed valve-lever $c'$ $c^2$, thus closing the valve. On this return movement of the link $e$ the arm $a^2$ of lever $a$ will come again into engagement with the notches $g^3$ and turn the hollow cylinder $g$ to the right into the position shown in Fig. 9, thus locking the cylinder $g$ to the projections $f$ by lugs $f'$, as shown in Fig. 11, and releasing the free end of the arm $c^4$, the latter now being capable of swinging freely without the two-armed valve-lever $c'$ $c^2$. Instead of a hollow cylinder a screw may be used as a detent member, mounted in the free end of the arm $c'$ and being capable of coupling the bell-crank lever with the valve-lever by suitable projections or to engage projections or openings in the bracket in order to lock the valve-lever in a similar manner as described with reference to Figs. 6 to 11.

What I claim is—

1. A valve-gear for intermittently and positively actuating a valve comprising a valve-lever connected with the valve, a bell-crank lever and a detent member arranged at the end of one arm of the valve-lever and capable of coupling the bell-crank lever with the valve-lever to impart motion for opening and closing the valve.

2. A valve-gear for intermittently and positively actuating a valve comprising a valve-lever connected with the valve, a bell-crank lever, a detent member at the end of one arm of the valve-lever and means for locking the detent member and valve-lever when the valve is closed.

3. A valve-gear for intermittently and positively actuating a valve comprising a valve-lever connected with the valve, a bell-crank lever, a detent member arranged at the end of one arm of the valve-lever and being capable of coupling the bell-crank lever with valve-lever and being locked to the bracket, and means for imparting motion to the bell-crank lever and the detent member.

In witness whereof I have hereunto signed my name in the presence of two subscribing witnesses.

WILHELM HARTMANN.

Witnesses:
  JOHANNES HEIN,
  WOLDEMAR HAUPT.